Figure 1:
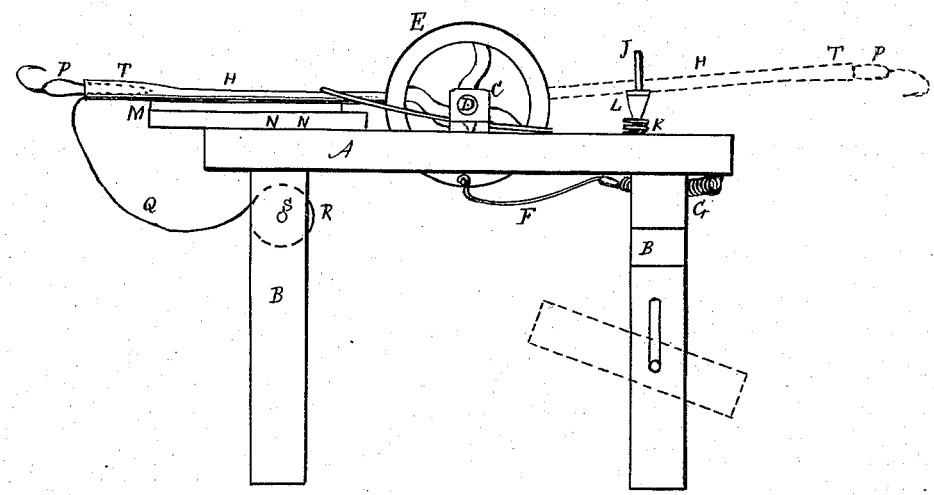

L. A. PECK.
Fishing Apparatus.

No. 156,648. Patented Nov. 10, 1874.

WITNESSES.
I. S. Lyon
Wm. E. Chaffee

Inventor:
Lewin A. Peck
By his Atty, J. Dennis Jr

UNITED STATES PATENT OFFICE.

LEWIN A. PECK, OF NEWTON, MASSACHUSETTS.

IMPROVEMENT IN FISHING APPARATUS.

Specification forming part of Letters Patent No. 156,648, dated November 10, 1874; application filed April 27, 1874.

*To all whom it may concern:*

Be it known that I, LEWIN A. PECK, of Newton, Middlesex county, in the State of Massachusetts, have invented certain new and useful Improvements in Mechanical Movements for Throwing Fishing-Trawls, Coils of Rope, &c.; and I hereby declare the following to be a full and exact description thereof, reference being had to the accompanying drawings forming part of this specification.

The nature or essence of my invention consists in the particular construction, combination, and arrangement of devices forming the improvements in mechanical movements for throwing fishing-trawls, coils of rope, &c., described in the following specification and shown in the drawings.

Figure 2:
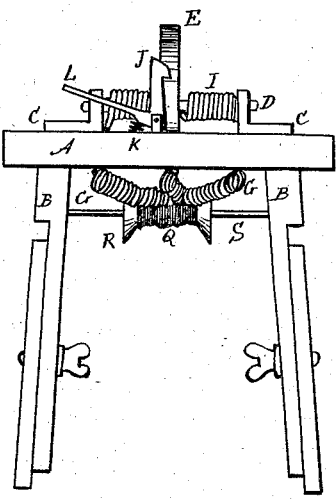

In the accompanying drawings, Figure 1 is a plan of a machine with my improvements. Fig. 2 is an elevation of one end.

In the above-mentioned drawings, A is the table or platform, supported by four legs, B B. The two rear legs are provided with slides and clamping-screws to adjust the rear of the table higher or lower, as desired. On the top of the table A I fasten two brackets, C C, for the shaft D of the wheel E to turn in, which wheel extends down through a slot in the table, and has the metal strap or band F fastened to it, so as to reach more than half-way around it, with one end fastened to the spiral or coiled springs G G, which are fastened to the under side of the rear end of the table to pull the wheel E and arm H fastened in the rim of the wheel around with a smart blow or stroke; and to increase the power of the wheel and force of the stroke, I apply the coiled spring I around the shaft D, and arrange it to act against the arm H. The spring-catch J is fastened to the table A to hold back the arm H, when the arm is set to throw the fishing trawl or troll. This catch is pressed forward to hold the arm by the spring K, and is drawn back to release the arm by depressing the lever L. The rubber cushion M is fastened to a slide, which traverses between the cleats N N fastened to the table A, to receive the arm H, when it throws the trawling device, consisting of the hook and weight or sinker, P, fastened to the line Q, which is wound on the spool R, which turns on the rod S between the two front legs of the table. At the end of the arm H I fasten a tube, T, split on one side, to yield or spring open when the sinker P is pushed in to hold it with friction until it is thrown.

To operate this machine, the arm H is brought over under the catch J, and the sinker P placed in the tube T, as shown by dotted lines, and the line Q unwound from the spool R, when the lever L may be depressed to release the arm H, which is thrown over by the springs with such force as to throw out the sinker and throw it to some distance from the machine. By placing a disk on the front of the tube with a pin in it to hang a coil of line on, the line may be thrown to or from a vessel that is wrecked.

What I claim is—

The above-described fishing implement, consisting of the wheel E, spring G G and I, arm H, with spring-tube T, sinker P, line Q, catch J, and cushion M, combined and arranged as described.

LEWIN A. PECK.

Witnesses:
 THOMAS WEST N,
 S. K. TOBEY.